(12) United States Patent
Tseng

(10) Patent No.: US 11,792,674 B2
(45) Date of Patent: Oct. 17, 2023

(54) GLOBAL COMMUNICATION NETWORK SYSTEM BASED ON MICRO BASE STATION AND EDGE COMPUTING

(71) Applicant: Kingtronics Institute of Science and Technology (Xiamen) Co., Ltd, Fujian (CN)

(72) Inventor: Chee Henry Tseng, Fujian (CN)

(73) Assignee: Kingtronics Institute of Science and Technology (Xiamen) Co., Ltd, Xiamen (CN)

(*) Notice: Subject to any disclaimer, the term of this patent is extended or adjusted under 35 U.S.C. 154(b) by 108 days.

(21) Appl. No.: 17/505,013

(22) Filed: Oct. 19, 2021

(65) Prior Publication Data

US 2022/0038937 A1 Feb. 3, 2022

(30) Foreign Application Priority Data

Dec. 14, 2020 (CN) .......................... 202011465187.4

(51) Int. Cl.
*H04W 28/02* (2009.01)
*H04L 69/08* (2022.01)
(Continued)

(52) U.S. Cl.
CPC ........... *H04W 28/021* (2013.01); *H04L 69/08* (2013.01); *H04W 28/0215* (2013.01);
(Continued)

(58) Field of Classification Search
CPC ... H04W 28/02; H04W 28/021; H04W 48/08;
H04W 48/12; H04W 28/00; H04W 28/0215; H04W 48/00; H04W 48/16; H04W 88/00; H04W 88/08; H04W 88/085; H04W 84/00; H04W 84/02; H04W 84/04–047; H04W 84/06; H04W 4/00; H04W 4/33; H04W 16/00; H04W 16/02; H04W 16/12; H04L 69/06; H04L 69/08; H04L 12/00; H04L 12/2801; H04L 12/2858; H04L 12/2896; H04L 2012/5629; H04L 67/1809; H04L 63/00;
(Continued)

(56) References Cited

U.S. PATENT DOCUMENTS

| 2018/0234803 A1* | 8/2018 | Girod ..................... B64G 1/428 |
| 2020/0008044 A1* | 1/2020 | Poornachandran ... H04W 16/18 |

(Continued)

FOREIGN PATENT DOCUMENTS

| CN | 106686607 A | 5/2017 |
| CN | 108512880 A | 9/2018 |

(Continued)

*Primary Examiner* — Warner Wong

(57) ABSTRACT

The present disclosure provides a global communication network system based on a micro base station and edge computing, including at least one micro base station. Each micro base station includes an edge computing center, a business network element and a micro base station access network. The comprehensive carrying capability of a wireless network, the regional resource sharing capability, the computing capability of an access terminal, the flexible application capability of the access terminal and user experience of extremely low delay are improved.

8 Claims, 6 Drawing Sheets

(51) Int. Cl.
  *H04W 48/12* (2009.01)
  *H04W 48/16* (2009.01)
  *H04W 88/08* (2009.01)
  *H04L 12/28* (2006.01)
  *H04L 67/289* (2022.01)
  *H04W 84/02* (2009.01)
  *H04W 16/22* (2009.01)

(52) U.S. Cl.
  CPC ........... *H04W 48/12* (2013.01); *H04W 48/16* (2013.01); *H04W 88/085* (2013.01); *H04L 12/2856* (2013.01); *H04L 12/2858* (2013.01); *H04L 12/2896* (2013.01); *H04L 67/289* (2013.01); *H04W 16/22* (2013.01); *H04W 84/02* (2013.01)

(58) Field of Classification Search
  CPC ..... H04L 63/0209; H04L 61/00; H04L 65/00; H04L 65/10; H04L 65/1013; H04L 67/00; H04L 67/2866; H04L 67/288; H04L 67/2885; H04L 67/289
  See application file for complete search history.

(56) References Cited

U.S. PATENT DOCUMENTS

| | | | | |
|---|---|---|---|---|
| 2020/0259896 | A1* | 8/2020 | Sachs | H04J 3/0667 |
| 2020/0404069 | A1* | 12/2020 | Li | H04W 8/24 |
| 2022/0247678 | A1* | 8/2022 | Atwal | H04W 12/033 |
| 2023/0108178 | A1* | 4/2023 | Xu | H04W 36/0007 370/312 |

FOREIGN PATENT DOCUMENTS

| | | | | |
|---|---|---|---|---|
| CN | 111405578 A | * | 7/2020 | ............ H04W 16/18 |
| CN | 111866950 A | | 10/2020 | |
| EP | 2717630 | * | 4/2014 | ............ H04W 48/20 |

* cited by examiner

GLOBAL COMMUNICATION NETWORK SYSTEM BASED ON MICRO BASE STATION AND EDGE COMPUTING

CROSS-REFERENCE TO RELATED APPLICATIONS

This application claims the benefit of priority from Chinese Patent Application No. 202011465187.4, filed on Dec. 14, 2020. The content of the aforementioned application, including any intervening amendments thereto, is incorporated herein by reference in its entirety.

FIELD

The present disclosure relates to the technical field of computers, and particularly relates to a global communication network system based on a micro base station and edge computing.

BACKGROUND

With the maturity of 5G technology and the promotion of various application scenarios, explosively increasing network traffic and various rapidly emerging new business modes make a 5G network present "large scale" and "intensive" characteristics. However, access of massive terminals and ever-increasing user business demands have also put tremendous pressure on 5G network carrying, system cost, and energy efficiency.

At present, 5G networking achieves the breadth and depth of network coverage by using a method for combining a macro base station and a micro base station.

Each micro base station is responsible for serving neighboring cellular users, but for indoor users, what technical methods should be used to meet the convenience and reliability of terminal network access is still a problem that needs to be optimized and solved.

Cloud computing is a technology designed to break through the limitations of the computing capability (storage capability) of mobile terminals. A terminal device transfers its own computing tasks (storage tasks) to cloud for execution to save its own limited computing resources (storage resources) and reduce energy consumption. The computing capability of a cloud server is extremely high, but a path from a terminal to the cloud server is long and crowded, so that the delay is extremely long. With the development of mobile communication technology and the rise of intelligent manufacturing industry, some applications on the terminal put forward higher requirements on the delay performance, such as automatic control of industrial robots, an augmented reality (AR) technology, and a game. Therefore, in order to meet these demands, the concept of edge computing came into being. However, how to determine a position where an edge computing center is deployed, what services the edge computing center provides, how to provide services, and how to specifically realize decentralization are also problems urgently needed to be resolved.

SUMMARY

The technical problem to be solved by the present disclosure is to provide a global communication network system based on a micro base station and edge computing, which improves the comprehensive carrying capability of a wireless network, the regional resource sharing capability, the computing capability of an access terminal, the flexible application capability of the access terminal and user experience of extremely low delay.

In a first aspect, the present disclosure provides a global communication network system based on a micro base station and edge computing, including at least one micro base station. Each micro base station includes an edge computing center, a business network element and a micro base station access network;

the edge computing center provides edge computing center infrastructure services including a computing service, a network service, a cloud storage service and a security service through virtualized and hyper-converged architecture, and further provides a virtual terminal service, distributed parallel task scheduling, a distributed task execution service and a distributed data warehouse; and the services of the edge computing center are visible to the business network element;

the business network element adopts a solution of separating a control plane from a user plane to decentralize a business demand function of a network user; the control plane is responsible for mobility and access management of a user terminal, session management, strategy control, user data management, authentication management, and security mode control; the user plane is responsible for executing routing and business forwarding functions; the business network element is responsible for distributing and guiding traffic of the user terminal to the edge computing center to form a business data closed loop in the micro base station; meanwhile, non-real-time data processed by the edge computing center is stored to a cloud platform via an operator core network to provide data resources for big data analysis and artificial intelligence (AI); then, the edge computing center acquires business optimization information from the cloud platform;

the micro base station access network enables a wireless network to cover all regions of all floors in a building to provide a wireless network access service for a distributed unit, i.e., a user terminal, in the building.

Further, the micro base station access network includes a baseband signal central processing network element, a signal aggregator, a plurality of baseband signal distribution processing units, and a plurality of antenna and radio frequency signal processing units; the baseband signal central processing network element is connected to the signal aggregator; the signal aggregator is connected to each baseband signal distribution processing unit; each baseband signal distribution processing unit is connected to at least one antenna and radio frequency signal processing unit;

the baseband signal central processing network element is responsible for realizing a non-real-time wireless high-level protocol stack function and intensively processing and decomposing a baseband signal;

the baseband signal distribution processing unit is responsible for realizing a function of a physical layer and a function of a real-time demand layer;

the signal aggregator is used for aggregating data of the plurality of baseband signal distribution processing units to the baseband signal central processing network element and working together with the baseband signal central processing network element to complete baseband signal processing, thus realizing coordination of performance and load management and real-time performance optimization, and a software defined network and a network virtualization function may be used and may be configured to meet needs of different application scenarios;

the antenna and radio frequency signal processing unit is responsible for wireless signal coverage of this region, adopts multiple frequencies, multiple modes and multiple antennas, and has multiple frequency bands and multiple systems, the antenna and radio frequency signal processing unit is provided with a communication interface and used for remotely intensively adjusting a carrier frequency, a beam and power of each transmitting unit.

Further, the micro base station is connected to the operator core network through an optical fiber, and the user terminal obtains services of an operator and accesses the Internet through the operator core network.

Further, a satellite and ground relay station is further included. The micro base station is connected to a space base station through the satellite and ground relay station, and then is connected to the operator core network; the plurality of micro base stations are connected to each other through the business network element, and the traffic of the indoor user terminal is automatically distributed and guided to an edge computing center business system in the corresponding micro base station to realize resource sharing of the plurality of micro base stations.

Further, a virtual terminal application service of the edge computing center includes:
  constructing a virtual terminal on demand:
    for a terminal having or entering an indoor network, the edge computing center creates the virtual terminal according to a unique identification code of the terminal, and the terminal uses the function of the virtual terminal or uses the virtual terminal; a user can customize a desired service through the virtual terminal or download desired application software;
    for a fixed application scenario, factory/enterprise business-related user information, virtual terminal configuration information and business data are stored in a cloud storage to ensure the data security of a factory/enterprise and the integrity and availability of the data; for a private application scenario, personal private data is stored in the terminal native machine; and
  logging out the virtual terminal and recovering resources:
    a virtual terminal manager of the edge computing center sets a user logout strategy; for a fixed user of this region, the virtual terminal is retained until being manually logged out; for a temporary user of this region, once the user terminal leaves this region, the virtual terminal enters a resource recovery queue and is logged out in sequence according to the first in and first out principle, and the resources are recovered.

Further, the virtual terminal includes a resource pool; the resource pool includes terminal information and provides application software invoking; and the virtual terminal provides cloud computing and cloud storage services.

Further, the edge computing center provides a "terminal resource mapping service" that is loaded to the virtual terminal and provides a physical terminal mapping service so that the virtual terminal on the server accesses an actual physical terminal device.

Further, the edge computing center provides an "intelligent protocol conversion module" that is loaded to the virtual terminal and provides protocol conversion, package and parsing services for application software and a physical terminal.

Further, the distributed parallel task scheduling and distributed task execution services
  features of a data packet:
    parameter defining:
      ts: time stamp (UTC)
      ip1: network address of source terminal
        id1: unique identification code of source terminal
      ip2: network address of target terminal, defaulted
      id2: unique identification code of target terminal, defaulted
      pr: authentication information
      sd: security level
      py: priority level
      td1: maximum allowable delay
      td2: actual delay
      taskid: task ID
      mtd: task dependency
      bsdata: business data
  contents of the data packet:
  data packet sent/received by a business system=F(ts, ip1, id1, ip2, id2, pr, sd, py, td1, td2, taskId, mtd)+bsdata;
  mtd=F1 (task 1 that must be processed first, task 2 that must be processed first, . . . , task n that must be processed first);
  distributed parallel task scheduling flow: maintaining an "available service list" of the edge computing center, parsing F(ts, ip1, id1, ip2, id2, pr, sd, py, td1, td2, taskId, mtd) from the data packet, hierarchically parsing parameters: ts, ip1, id1, ip2, id2, pr, sd, py, td1, td2, taskId, mtd, preferentially distributing tasks to be executed according to the "priority level" and the "maximum allowable delay", distributing task offloading channels according to the resource capability, putting "task ID" into task queues of all the channels respectively, maintaining the task list, and monitoring task execution;
  distributed task execution service flow: acquiring the to-be-executed tasks from the task queues of all the channels, or executing a preference strategy and then executing the tasks, refusing to execute illegal/insecure user-initiated tasks according to the "authentication information" and "security level", feeding back the task execution to a scheduling center, and returning task execution data to a task initiator.

One or more technical solutions provided in the embodiments of the present disclosure at least have the following technical effects or advantages:
1. An efficient global communication network with network coverage breadth and depth can be constructed.
2. In the era of the Internet of Everything, 80% of application scenarios are indoors, and massive data are mainly generated by indoor terminals. Micro base stations and edge computing centers are deployed in a building closest to the application scenarios, which not only ensures high-density, high-capacity, and high-reliability access and extremely low delay performance, but also solves the problem of data transmission congestion in a core backbone network and improves the utilization efficiency of resources (computing, storage, etc.).
3. The distributed scheduling and execution of the tasks ensure the efficiency and security of the task execution and ensures low delay of the task execution.
4. Key business data of the enterprise is stored in the edge computing center of the micro base station, which can guarantee the data security of the the enterprise and the integrity and availability of data.
5. The need of the user terminal for a user experience of applying complicated computation or obtaining extremely low delay although the native machine resource capability is limited is solved, and at the same time, successful execution of key business can be guaranteed.

6. An application software development platform is built in the edge computing center. In addition to providing general-purpose cloud computing and cloud storage services, extremely valuable physical terminal access, monitoring, and scheduling services can also be provided. It is available for developers to build an integrated monitoring system for physical terminal devices.
7. The micro base stations and the edge computing center can be established through cooperation between operators and enterprises, so that a huge space is opened up for the operators to expand their business.
8. No wiring is required for terminal networking, so that the use is convenient.
9. The scale of the edge computing center can be built on demand, the cost is controllable, and the operation and maintenance are convenient.

The foregoing description is only an overview of the technical solutions of the present disclosure. To know the technical means of the present disclosure more clearly, the technical solutions can be implemented in accordance with the content of the description, and to make the foregoing and other objectives, features and advantages of the present disclosure more understandable, specific implementation modes of the present disclosure are exemplified below.

BRIEF DESCRIPTION OF THE DRAWINGS

The present disclosure will be further described below in combination with the accompanying drawings and embodiments.

DETAILED DESCRIPTION OF EMBODIMENTS

The embodiments of the present application provide a wireless network service, a virtual terminal service and a distributed edge computing service for an indoor user terminal (a mobile phone, a computer, a PDA, an industrial terminal, etc.) of a building by means of providing a global communication network system based on a micro base station and edge computing, and can be expanded to application of satellite communication to build a global communication network. The comprehensive carrying capacity of a wireless network, the regional resource sharing capability, the computing capability of an access terminal, the flexible application capability of the access terminal and user experience of extremely low delay are improved.

Figure 1:
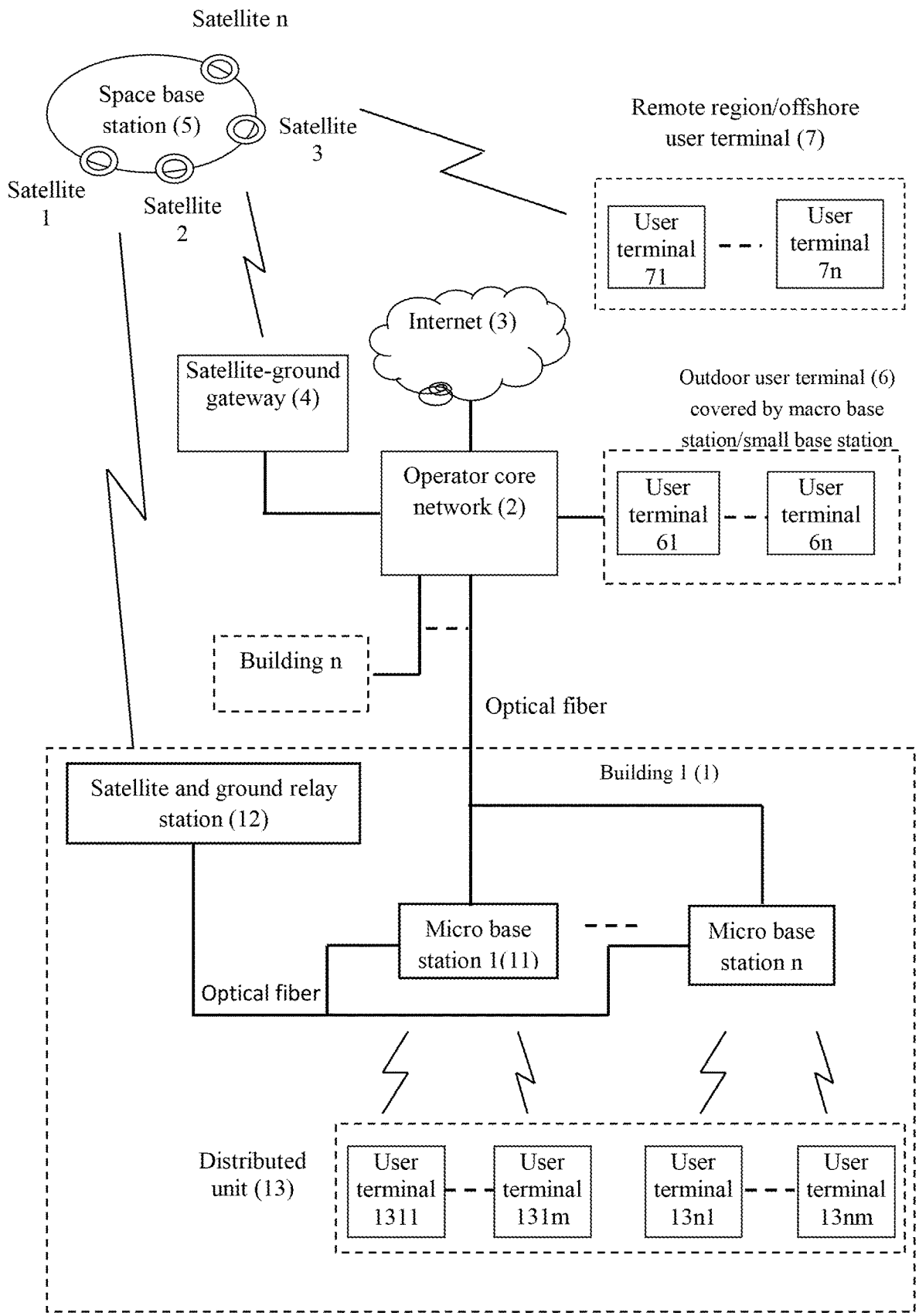
FIG. 1 is a structural diagram of a global communication network of the present disclosure.
Figure 2:
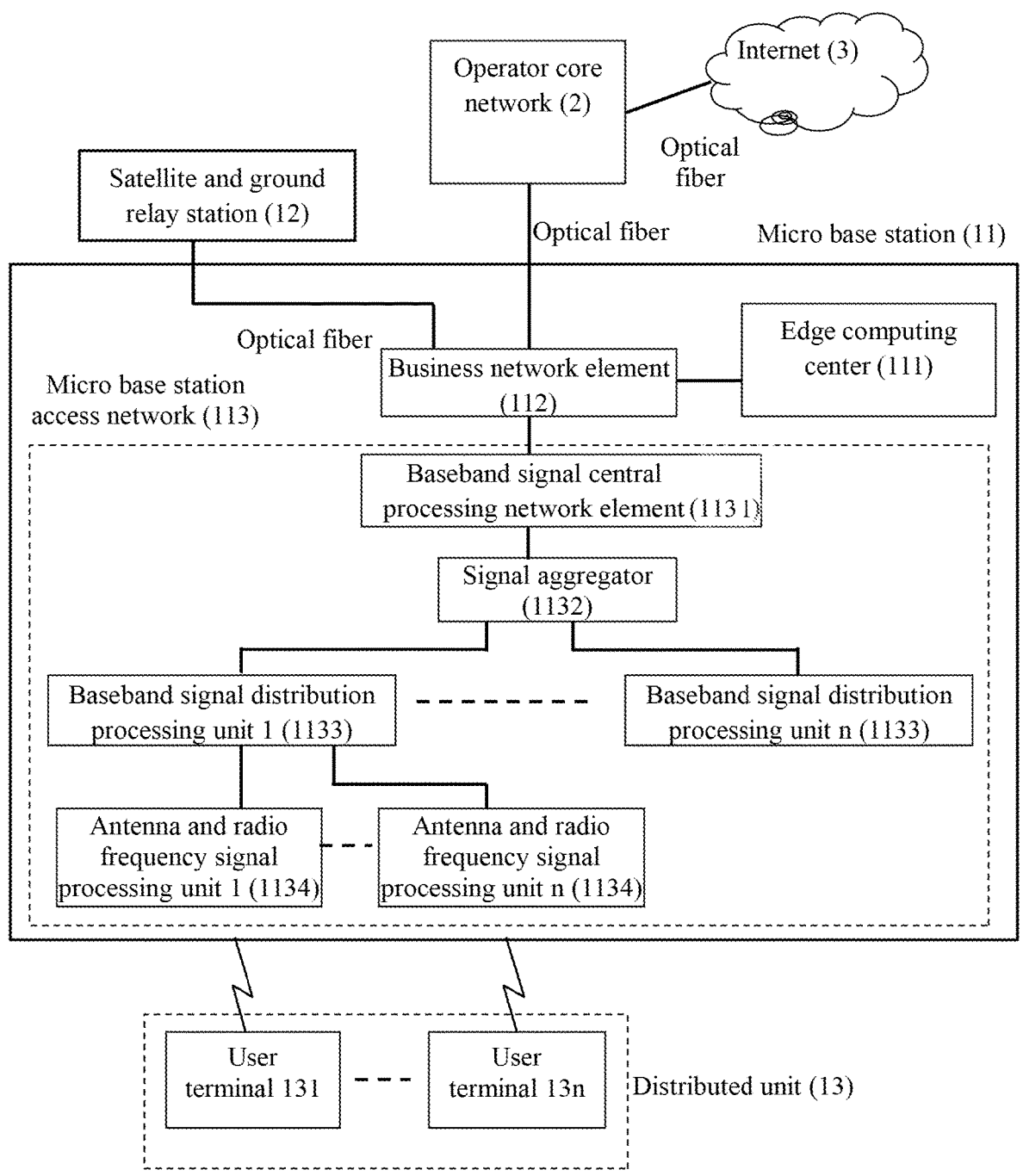
FIG. 2 is a structural diagram of a micro base station and a satellite and ground relay station in a building of the present disclosure.
Figure 3:
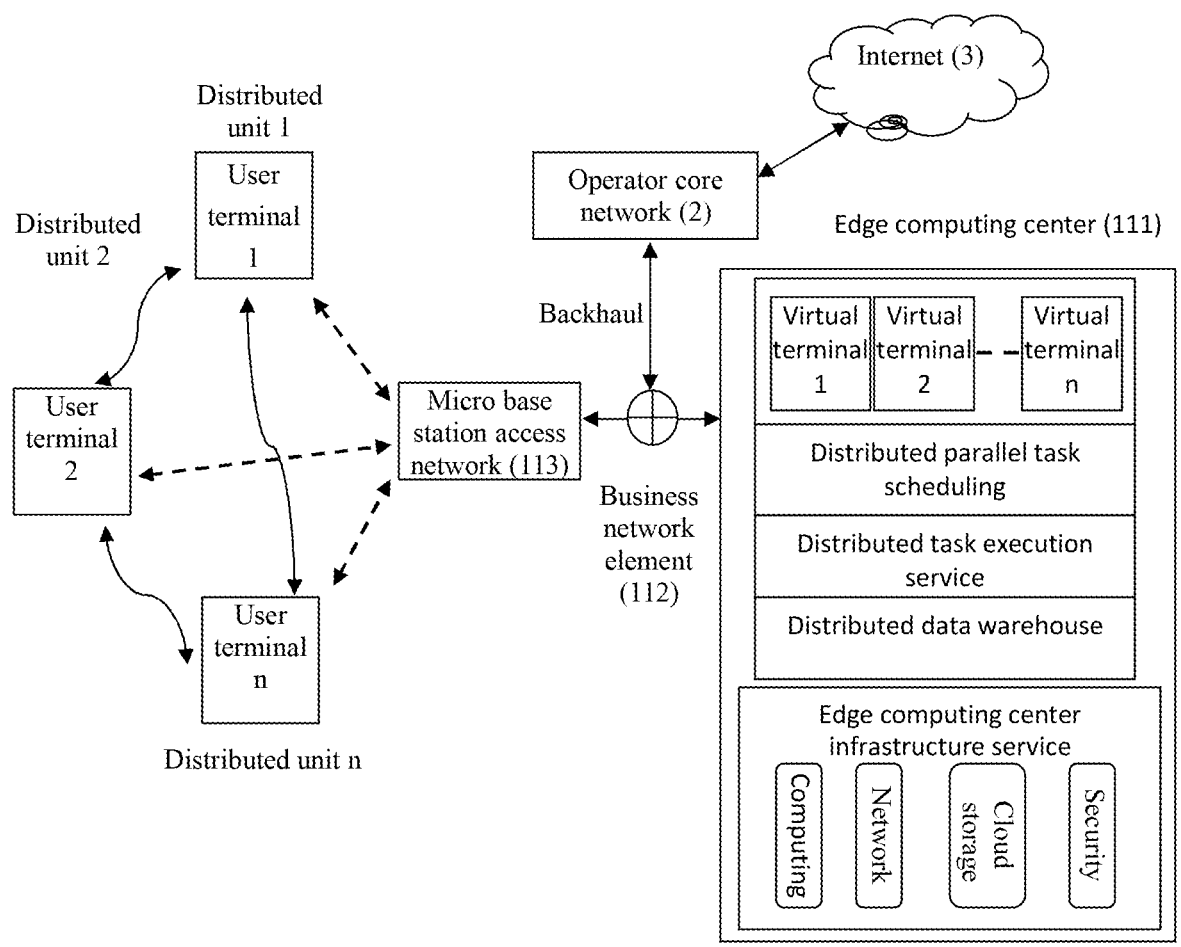
FIG. 3 is a schematic diagram of functions of an edge computing center and various applications of a terminal device.

The general thought of the technical solutions in the embodiments of the present disclosure is as follows:

1. Building of a global communication network:
1.1 As shown in FIG. 1 to FIG. 3, in order to improve the high rate, low delay and high capacity performance of a wireless network, all buildings in the world may be deployed with micro base stations, and each building may be deployed with a plurality of micro base stations according to different environments and different application scenarios.
1.2 The micro base station (11) includes: an edge computing center (111), a business network element (112), and a micro base station access network (113).
1.2.1 The edge computing center (111) provides edge computing center infrastructure services including a computing service, a network service, a cloud storage service and a security service through virtualized and hyper-converged architecture, and further provides a virtual terminal service, distributed parallel task scheduling, a distributed task execution service and a distributed data warehouse. The services of the edge computing center are visible to the business network element (112).
1.2.2 The business network element (112) adopts a solution of separating a control plane from a user plane to decentralize a business demand function of a network user.

The control plane is responsible for mobility and access management of a user terminal, session management, strategy control, user data management, authentication management, and security mode control. The user plane is responsible for executing routing and business forwarding functions.

The business network element (112) is logically separated from and loosely coupled to an operator core network (2) and a business system of the edge computing center (111), and is responsible for distributing and guiding traffic of the user terminals in this building to the business system of the edge computing center to form a business data closed loop in the micro base station, thus ensuring the data security and greatly reducing the data volume transmitted by a backbone network of the core network. Meanwhile, non-real-time data processed by the edge computing center (111) is stored to a cloud platform via the operator core network (2) to provide data resources for big data analysis and artificial intelligence (AI). The edge computing center (111) can acquire business optimization information from the cloud platform.

1.2.3 The micro base station access network (113) includes a baseband signal central processing network element (1131), a signal aggregator (1132), a plurality of baseband signal distribution processing units (1133), and a plurality of antenna and radio frequency signal processing units (1134). The baseband signal central processing network element (1131), the signal aggregator (1132) and the plurality of baseband signal distribution processing units (1133) are typically connected through optical fibers; and the baseband signal distribution processing units (1133) may be connected with the plurality of antenna and radio frequency signal processing units (1134) through an optical fiber or a network cable. The network cable may be powered over Ethernet (POE).

The baseband signal central processing network element (1131) is mainly responsible for realizing a non-real-time wireless high-level protocol stack function and intensively processing and decomposing a baseband signal, such as compressing and encoding. The baseband signal distribution processing unit (1133) is mainly responsible for realizing a function of a physical layer and a function of a real-time demand layer. The signal aggregator (1132) is used for aggregating data of the plurality of baseband signal distribution processing units (1133) to the baseband signal central processing network element (1131) and working together with the baseband signal central processing network element (1131) to complete baseband signal processing, thus realizing coordination of performance and load management and real-time performance optimization, and a software defined network and a network virtualization function may be used and may be configured to meet needs of different application scenarios, such as variability of transmission delay.

Each baseband signal distribution processing unit (1133) may be connected to a plurality of antenna and radio frequency signal processing units (1134). The antenna and radio frequency signal processing unit (1134) is responsible for wireless signal coverage of this region, adopts multiple frequencies, multiple modes and multiple antennas, and has multiple frequency bands and multiple systems. Meanwhile, the antenna and radio frequency signal processing unit (1134) may be provided with a communication interface and be used for remotely intensively adjusting a carrier frequency, a beam and power of each transmitting unit to achieve optimal region coverage and provide good operation and maintenance capability.

The micro base station access network (113) enables a wireless network to cover all regions of all floors in a building to provide a wireless network access service for a distributed unit (13), i.e., a user terminal, in the building. A typical application of a radio carrier frequency band is centimeter wave, and may also be extended to millimeter wave. Various wireless communication technologies (such as 5G, 6G, and WIFI) may be adopted to improve the convenience of wireless network access.

Figure 4:
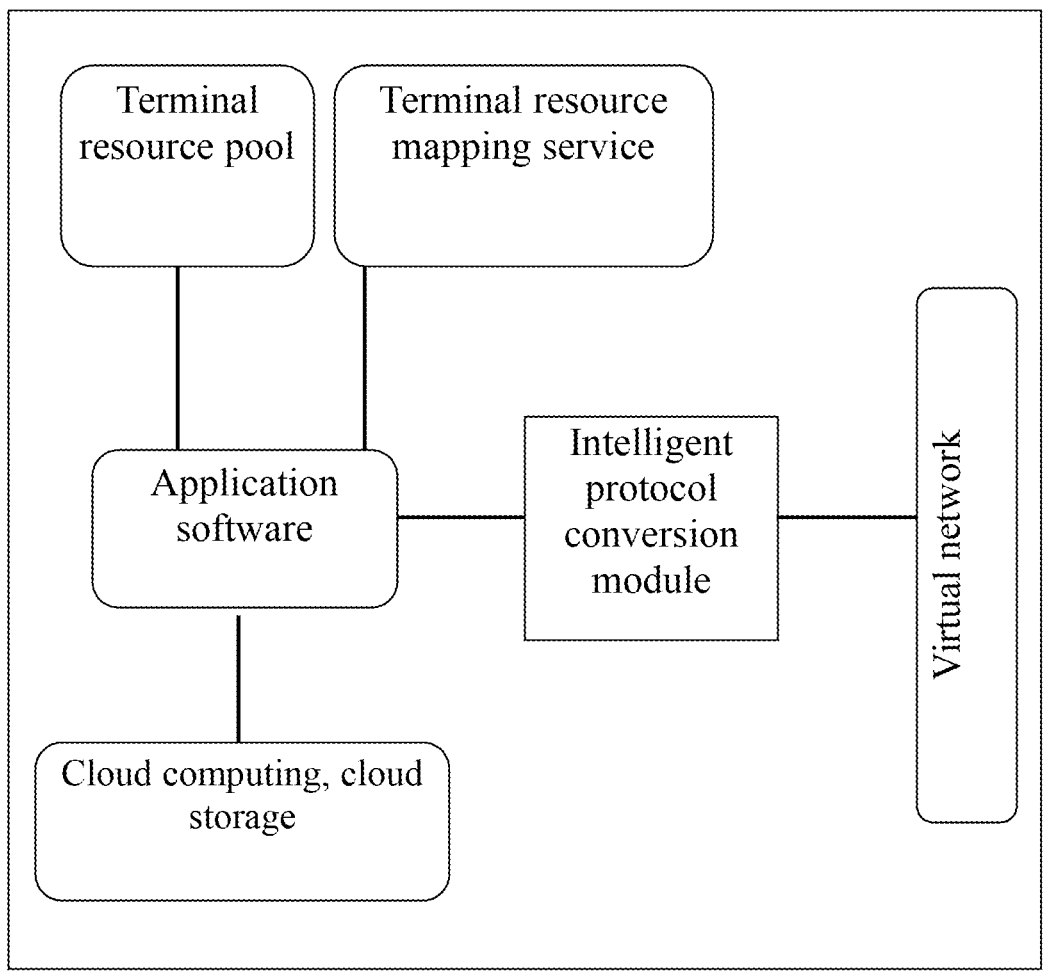
FIG. 4 is a diagram of main functional modules of a virtual terminal of the present disclosure.

- 1.3 The micro base station (11) is connected to the operator core network (2) through an optical fiber. The user terminals in the building can obtain services of an operator and access the Internet (3) through the operator core network (2). One satellite and ground relay station may be installed in the building without valid wired resources such as an optical fiber or in the case that it is too expensive to deploy an optical fiber, and connection to the operator core network (2) is built through satellite-to-ground communication. The operator core network (2) communicates with a satellite through a satellite-ground gateway (4).
- 1.4 Multiple micro base stations (11) are connected through the business network element (112), and the traffic of the indoor user terminal can be automatically distributed and guided to the edge computing center business system in the corresponding micro base station to realize resource sharing of multiple micro base stations.
- 1.5 The typical application of a satellite-to-ground communication carrier frequency band between the satellite and ground relay station (12) and a space base station (5) is millimeter wave, or may be other wave bands. The satellite and ground relay station (12) is connected to the micro base station through an optical fiber. The data backhaul of the satellite and ground relay station (12) has a satellite signal calibration function with Doppler frequency shift and time delay.
- 1.6 Outdoor user terminals access the operator core network (2) through the macro base station/small base station of the operator.
- 1.7 Remote regions/offshore user terminals directly access the operator core network (2) through satellite-to-ground communication.
- 1.8 There are multiple operator core networks in the world, and the operator core networks are interconnected to build a wide-area global communication network covering the world.
2. In order to ensure the synchronization and consistency of global communication, the network standard time is based on Universal Time Coordinated (UTC), and the communication data packets each include a timestamp.
3. As shown in FIG. 4, a virtual terminal application service of the edge computing center:
- 3.1 Virtual terminals such as a virtual mobile phone, a virtual computer, and a virtual PAD can be built on demand:
- 3.1.2 Creation and use: for a terminal having or entering an indoor network, the edge computing center will create the virtual terminal (the virtual mobile phone/virtual computer/virtual PAD) according to a unique identification code of the terminal, and the terminal can both use the function of the native machine or use the virtual terminal; a user can customize a self-desired service through the virtual terminal or download desired application software. By means of the virtual terminal, powerful computing capability and massive cloud storage functions of the edge computing center can be obtained.
- 3.1.2 Storage: for a fixed application scenario such as an intelligent factory and an enterprise, factory/enterprise business-related user information, virtual terminal configuration information and business data are stored in a cloud storage to ensure the data security of a factory/enterprise and the integrity and availability of the data. For a private application scenario, personal private data is stored in the terminal native machine.
- 3.1.3 Logging out of the virtual terminal and resource recovery: a virtual terminal manager of the edge computing center can set a user logout strategy; for a fixed user of this region, the virtual terminal is retained until being manually logged out; for a temporary user of this region, once the user terminal leaves this region, the virtual terminal enters a resource recovery queue and is logged out in sequence according to the first in and first out principle, and the resources are recovered.
- 3.2 Virtual terminal application solution
- 3.2.1 The virtual terminal includes a connectable terminal resource pool, and the resource pool includes available terminal information: a name of the terminal, a network address of the terminal, a unique identification code of the terminal, a communication protocol type, etc. Application software invoking can be provided.
- 3.2.2 The edge computing center provides a "terminal resource mapping service" that can be loaded to the virtual terminal and provides a physical terminal mapping service so that the virtual terminal on the server can access an actual physical terminal device.
- 3.2.3 The edge computing center provides an "intelligent protocol conversion module" that can be loaded to the virtual terminal and provides protocol conversion services for application software and a physical terminal.
- 3.2.4 The virtual terminal provides cloud computing and cloud storage services.
- 3.2.5 Functions of the intelligent protocol conversion module:
1) For application scenarios with high reliability requirements (such as industrial control), a connection-based industrial TCP (transmission control protocol) standard is adopted to package actual access protocols (a Modbus protocol, an RS232 protocol, an RS485 protocol, a SMEMA protocol, and other self-defined protocols) of various devices to a TCP.

2) For application scenarios that do not require high reliability but require high rate (such as video transmission), a UDP (user datagram protocol) standard is adopted.

3) Encapsulation and parsing of various protocols are provided.

4. Distributed parallel task scheduling and execution of the edge computing center 4.1 Features of a data packet:

4.1.1 Parameter defining:

ts: time stamp (UTC)

ip1: network address of source terminal id1: unique identification code of source terminal ip2: network address of target terminal, defaulted id2: unique identification code of target terminal, defaulted pr: authentication information sd: security level py: priority level td1: maximum allowable delay td2: actual delay taskid: task ID mtd: task dependency bsdata: business data 4.2 Contents of the data packet:

data packet sent/received by a business system=F(ts, ip1, id1, ip2, id2, pr, sd, py, td1, td2, taskId, mtd)+bsdata; mtd=F1 (task 1 that must be processed first, task 2 that must be processed first, . . . );

for example: mtd=F1(taskId 1, taskId 2);

4.3 Illustration: the data packet includes part or all of the above-mentioned parameters, and is not limited to the above-mentioned parameters. There is no fixed order for the parameters.

Figure 6:
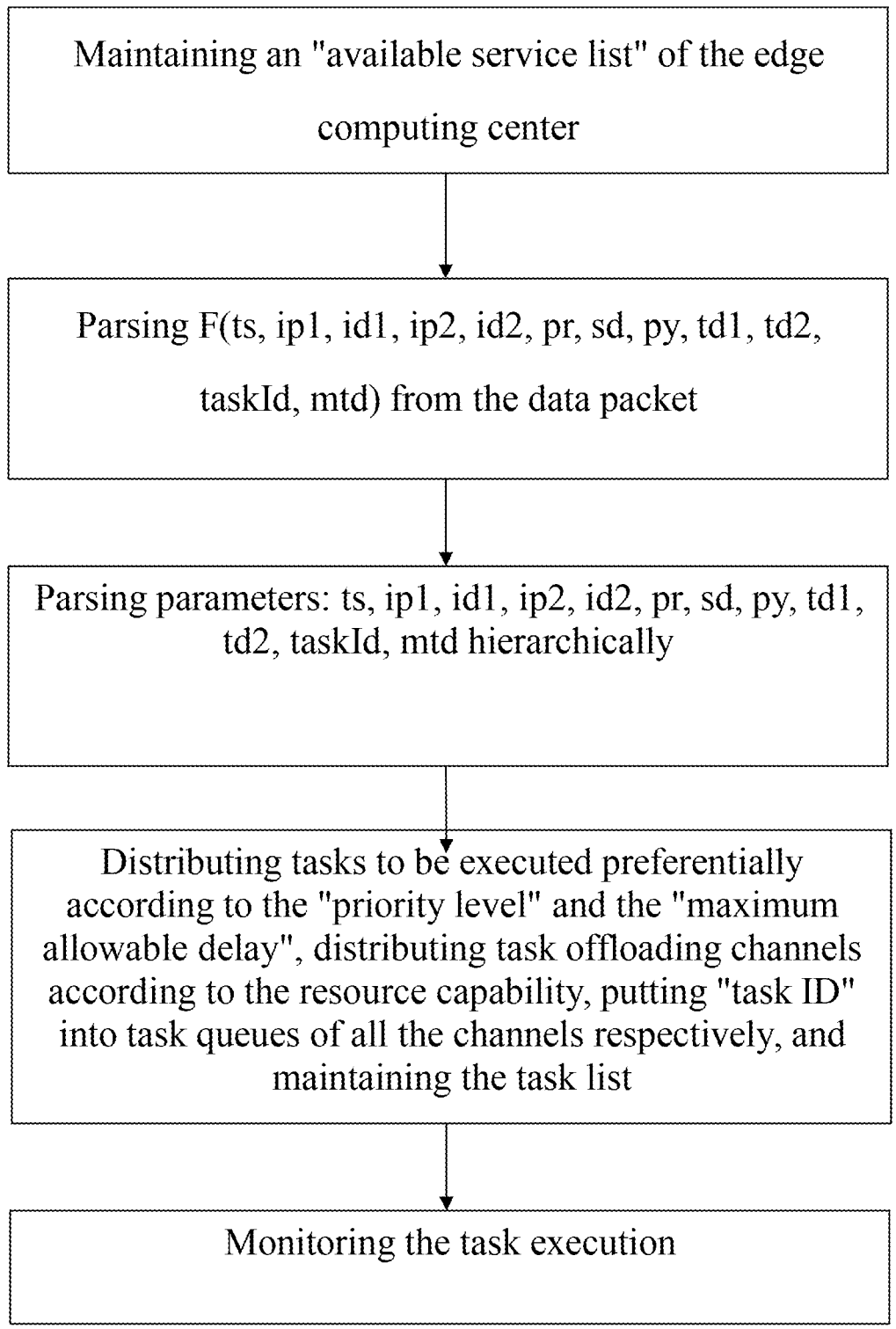
FIG. 6 is a flow chart of task scheduling of the present disclosure.

4.4 Distributed parallel task scheduling and execution flow:

4.4.1 As shown in FIG. 6, task scheduling flow: maintaining an "available service list" of the edge computing center; parsing F(ts, ip1, id1, ip2, id2, pr, sd, py, td1, td2, taskId, mtd) from the data packet; hierarchically parsing parameters: ts, ip1, id1, ip2, id2, pr, sd, py, td1, td2, taskId, mtd; preferentially distributing tasks to be executed according to the "priority level" and the "maximum allowable delay"; distributing task offloading channels according to the resource capability; respectively putting "task ID" into task queues of all the channels respectively; and maintaining the task list, and monitoring task execution.

Figure 7:
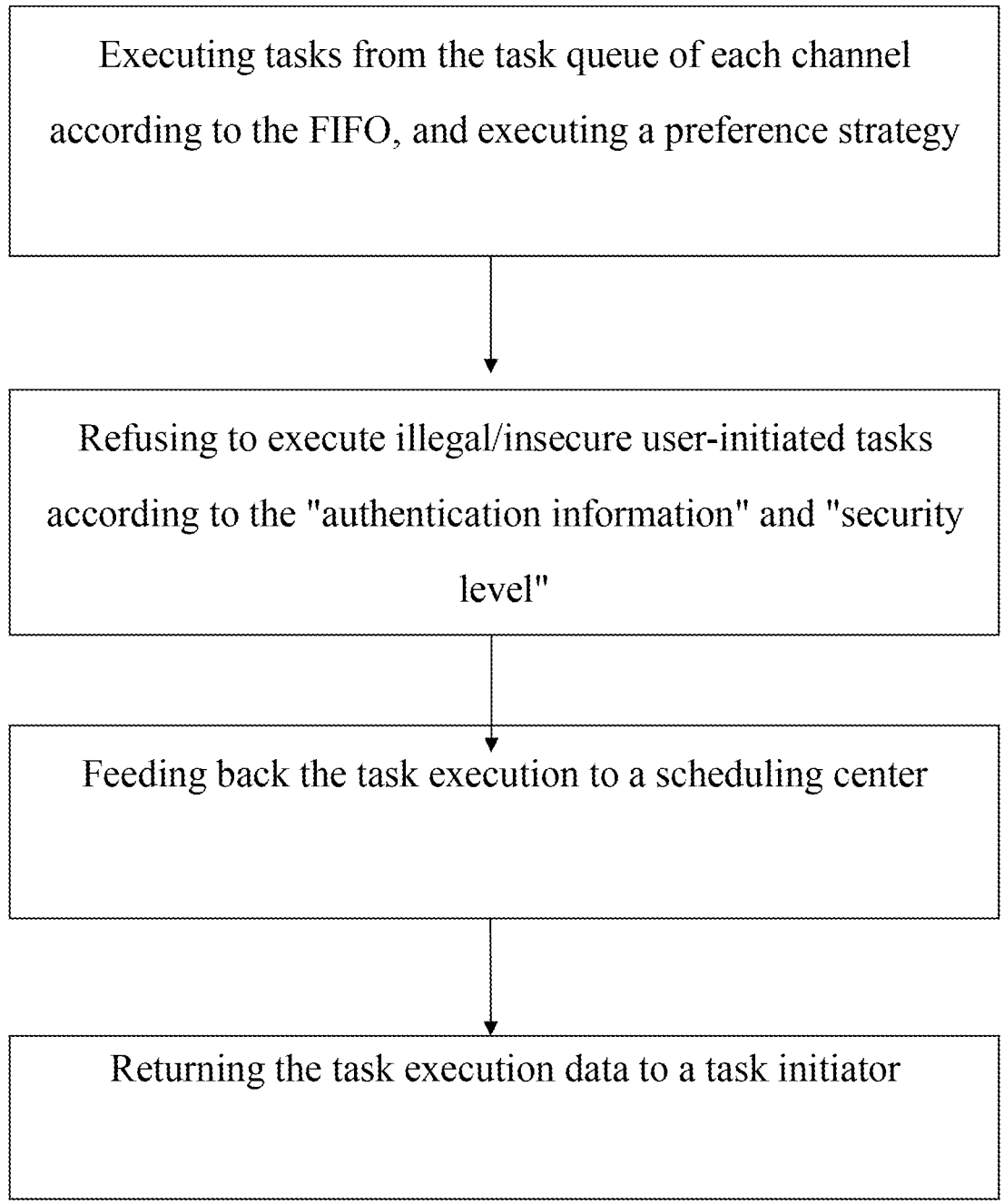
FIG. 7 is a flow chart of task execution in the present disclosure.

4.4.2 As shown in FIG. 7, task execution flow: executing tasks from the task queue of each channel according to first in first out (FIFO), also executing a preference strategy, and refusing to execute illegal/insecure user-initiated tasks according to "authentication information" and "security level"; feeding back the task execution to a scheduling center, and returning the task execution data to a task initiator.

Figure 5:
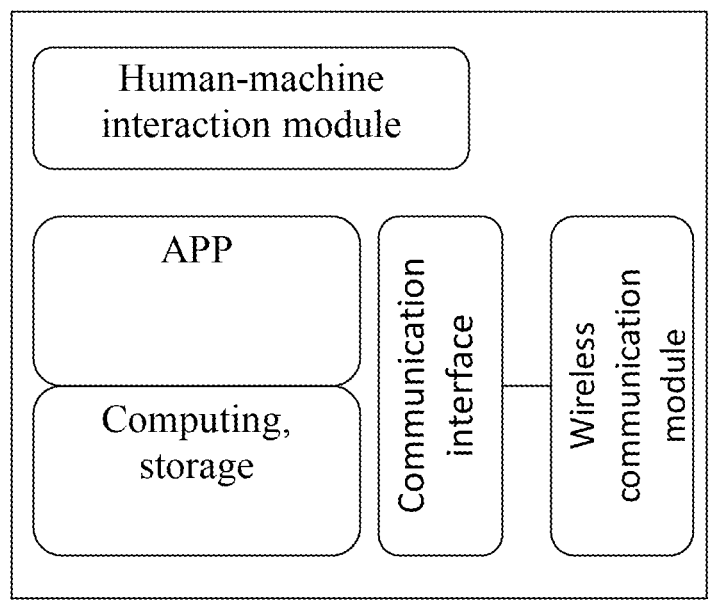
FIG. 5 is a diagram of main functional modules of a distributed unit, namely a user terminal of the present disclosure.

5. Various applications of a terminal device (distributed unit) covered by an indoor network of the micro base station 5.1 As shown in FIG. 5, each indoor terminal device is a distributed unit, which has certain computing capability, storage capability and communication capability, including APP, computing, storage, a human-computer interaction module, a communication interface, and a wireless communication module. Real-time businesses can be executed in the native machine, and the data can also be stored in the native machine.

5.2 Each terminal device maintains the "connectable wireless device list".

5.3 Each terminal device can realize direct communication between terminal devices through a wireless communication ad hoc network, realizing the lowest delay of information interaction and least use the traffic of the micro base station, so that the overall capacity and communication efficiency of the micro base station are improved. It is especially suitable for massively connected IoT application scenarios and industrial applications.

5.4 Each terminal device obtains local business services provided by the edge computing center through a micro base station access network, and can also obtain remote computing center services provided by the operator core network. The edge computing center carries local key services, which not only ensures the security of business, but also greatly reduces the pressure of backhaul of the massive data of the core network.

Embodiment I

The present embodiment provides a global communication network system based on a micro base station and edge computing, including at least one micro base station. Each micro base station includes an edge computing center, a business network element and a micro base station access network.

The edge computing center provides edge computing center infrastructure services including a computing service, a network service, a cloud storage service and a security service through virtualized and hyper-converged architecture, and further provides a virtual terminal service, distributed parallel task scheduling, a distributed task execution service and a distributed data warehouse; the services of the edge computing center are visible to the business network element;

the business network element adopts a solution of separating a control plane from a user plane to decentralize a business demand function of a network user; the control plane is responsible for mobility and access management of a user terminal, session management, strategy control, user data management, authentication management, and security mode control; the user plane is responsible for executing routing and business forwarding functions; the business network element is responsible for distributing and guiding traffic of the user terminal to the edge computing center to form a business data closed loop in the micro base station; meanwhile, non-real-time data processed by the edge computing center is stored to a cloud platform via an operator core network to provide data resources for big data analysis and artificial intelligence (AI); then, the edge computing center acquires business optimization information from the cloud platform;

the micro base station access network enables a wireless network to cover all regions of all floors in a building to provide a wireless network access service for a distributed unit, i.e., a user terminal, in the building.

The micro base station access network includes a baseband signal central processing network element, a signal aggregator, a plurality of baseband signal distribution processing units, and a plurality of antenna and radio frequency signal processing units; the baseband signal central processing network element is connected to the signal aggregator; the signal aggregator is connected to each baseband signal distribution processing unit; and each baseband signal distribution processing unit is connected to at least one antenna and radio frequency signal processing unit;

the baseband signal central processing network element is responsible for realizing a non-real-time wireless high-level protocol stack function and intensively processing and decomposing a baseband signal;

the baseband signal distribution processing unit is responsible for realizing a function of a physical layer and a function of a real-time demand layer;

the signal aggregator is used for aggregating data of the plurality of baseband signal distribution processing units to the baseband signal central processing network element and working together with the baseband signal central processing network element to complete baseband signal processing, thus realizing coordination of performance and load management and real-time performance optimization, and a software defined network and a network virtualization function may be used and may be configured to meet needs of different application scenarios;

the antenna and radio frequency signal processing unit is responsible for wireless signal coverage of this region, adopts multiple frequencies, multiple modes and multiple antennas, and has multiple frequency bands and multiple systems; the antenna and radio frequency signal processing unit is provided with a communication interface and used for remotely intensively adjusting a carrier frequency, a beam and power of each transmitting unit.

The micro base station is connected to the operator core network through an optical fiber, and the user terminal obtains services of the operator and accesses the Internet through the operator core network.

In another embodiment, the system further includes a satellite and ground relay station. The micro base station is connected to a space base station through the satellite and ground relay station, and then is connected to the operator core network. The plurality of micro base stations are connected to each other through the business network element, and the traffic of the indoor user terminal is automatically distributed and guided to an edge computing center business system in the corresponding micro base station to realize resource sharing of the plurality of micro base stations.

A virtual terminal application service of the edge computing center includes:

constructing a virtual terminal on demand:

for a terminal having or entering an indoor network, the edge computing center creates the virtual terminal according to a unique identification code of the terminal, and the terminal uses the function of the virtual terminal or uses the virtual terminal; a user can customize a desired service through the virtual terminal or download desired application software;

for a fixed application scenario, factory/enterprise business-related user information, virtual terminal configuration information and business data are stored in a cloud storage to ensure the data security of a factory/enterprise and the integrity and availability of the data; for a private application scenario, personal private data is stored in the terminal native machine;

logging out the virtual terminal and recovering resources: a virtual terminal manager of the edge computing center sets a user logout strategy; for a fixed user of this region, the virtual terminal is retained until being manually logged out; for a temporary user of this region, once the user terminal leaves this region, the virtual terminal enters a resource recovery queue and is logged out in sequence according to the first in and first out principle, and the resources are recovered.

The virtual terminal includes a resource pool; the resource pool includes terminal information and provides application software invoking; and the virtual terminal provides cloud computing and cloud storage services.

The edge computing center provides a "terminal resource mapping service" that is loaded to the virtual terminal and provides a physical terminal mapping service so that the virtual terminal on the server accesses an actual physical terminal device;

the edge computing center provides an "intelligent protocol conversion module" that is loaded to the virtual terminal and provides protocol conversion, package and parsing services for application software and a physical terminal.

The distributed parallel task scheduling and distributed task execution services features of a data packet:
parameter defining:
ts: time stamp (UTC)
ip1: network address of source terminal
id1: unique identification code of source terminal
ip2: network address of target terminal, defaulted
id2: unique identification code of target terminal, defaulted
pr: authentication information
sd: security level
py: priority level
td1: maximum allowable delay
td2: actual delay
taskid: task ID
mtd: task dependency
bsdata: business data contents of the data packet:
data packet sent/received by a business system=F(ts, ip1, id1, ip2, id2, pr, sd, py, td1, td2, taskId, mtd)+bsdata;
mtd=F1 (task 1 that must be processed first, task 2 that must be processed first, . . . , task n that must be processed first);

distributed parallel task scheduling flow: maintaining an "available service list" of the edge computing center, parsing F(ts, ip1, id1, ip2, id2, pr, sd, py, td1, td2, taskId, mtd) from the data packet, hierarchically parsing parameters: ts, ip1, id1, ip2, id2, pr, sd, py, td1, td2, taskId, mtd, preferentially distributing tasks to be executed according to the "priority level" and the "maximum allowable delay", distributing task offloading channels according to the resource capability, putting "task ID" into task queues of all the channels respectively, maintaining the task list, and monitoring task execution;

distributed task execution service flow: acquiring the to-be-executed tasks from the task queues of all the channels, or executing a preference strategy and then executing the tasks, refusing to execute user-initiated illegal/insecure tasks according to the "authentication information" and "security level", feeding back the task execution to a scheduling center, and returning task execution data to a task initiator.

Although the specific implementation modes of the present disclosure have been described above, those skilled in the art should understand that the specific embodiments described here are only illustrative, and are not used to limit the scope of the present disclosure. Equivalent modifications and changes made by those skilled in the art in accordance with the spirit of the present disclosure shall all fall within the scope of protection of the claims of the present disclosure.

What is claimed is:

1. A global communication network system based on a micro base station and edge computing, comprising:

at least one micro base station;

wherein the micro base station comprises an edge computing center, a business network element and a micro base station access network;

the edge computing center is configured to provide a computing service, a network service, a cloud storage service and a security service through virtualized and hyper-converged architecture, and is further configured to provide a virtual terminal service, distributed parallel task scheduling, a distributed task execution service and a distributed data warehouse; wherein services of the edge computing center are visible to the business network element;

the business network element is configured with a control plane and a user plane in separate form to decentralize a business demand function of a network user; the control plane is configured for mobility and access management of a user terminal, session management, strategy control, user data management, authentication management, and security mode control; the user plane is configured for executing routing and business forwarding functions;

the business network element is configured for distributing and guiding traffic of the user terminal to the edge computing center to form a business data closed loop in the micro base station; and the business network element is configured to store non-real-time data processed by the edge computing center to a cloud platform via an operator core network to provide data resources for big data analysis and artificial intelligence (AI); the edge computing center is configured to acquire business optimization information from the cloud platform;

the micro base station access network enables a wireless network to cover all regions of all floors in a building to provide a wireless network access service for a distributed unit, i.e., a user terminal, in the building;

the micro base station access network comprises a baseband signal central processing network element, a signal aggregator, a plurality of baseband signal distribution processing units, and a plurality of antenna and radio frequency signal processing units; the baseband signal central processing network element is connected to the signal aggregator; the signal aggregator is connected to each baseband signal distribution processing unit; each baseband signal distribution processing unit is connected to at least one antenna and radio frequency signal processing unit;

the baseband signal central processing network element is configured for realizing a non-real-time wireless high-level protocol stack function and intensively processing and decomposing a baseband signal;

the baseband signal distribution processing unit is configured for realizing a function of a physical layer and a function of a real-time demand layer;

the signal aggregator is configured to aggregate data of the plurality of baseband signal distribution processing units to the baseband signal central processing network element and working together with the baseband signal central processing network element to complete baseband signal processing, thus realizing coordination of performance and load management and real-time performance optimization, and the signal aggregator is configured with a software defined network and a network virtualization function to meet needs of different application scenarios;

the antenna and radio frequency signal processing unit is configured for wireless signal coverage of this region, adopts multiple frequencies, multiple modes and multiple antennas, and has multiple frequency bands and multiple systems; and the antenna and radio frequency signal processing unit is provided with a communication interface and is configured to remotely intensively adjust a carrier frequency, a beam and power of each transmitting unit.

2. The global communication network system based on a micro base station and edge computing according to claim 1, wherein the micro base station is connected to the operator core network through an optical fiber, and the user terminal is configured to obtain services of an operator and access the Internet through the operator core network.

3. The global communication network system based on a micro base station and edge computing according to claim 1, further comprising a satellite and ground relay station, wherein the micro base station is connected to a space base station through the satellite and ground relay station, and then is connected to the operator core network; the plurality of micro base stations are connected to each other through the business network element; and the traffic of the indoor user terminal is automatically distributed and guided to an edge computing center business system in the corresponding micro base station to realize resource sharing of the plurality of micro base stations.

4. A global communication network system based on a micro base station and edge computing, comprising:

at least one micro base station;

wherein the micro base station comprises an edge computing center, a business network element and a micro base station access network;

the edge computing center is configured to provide a computing service, a network service, a cloud storage service and a security service through virtualized and hyper-converged architecture, and is further configured to provide a virtual terminal service, distributed parallel task scheduling, a distributed task execution service and a distributed data warehouse; wherein services of the edge computing center are visible to the business network element;

the business network element is configured with a control plane and a user plane in separate form to decentralize a business demand function of a network user; the control plane is configured for mobility and access management of a user terminal, session management, strategy control, user data management, authentication management, and security mode control; the user plane is configured for executing routing and business forwarding functions;

the business network element is configured for distributing and guiding traffic of the user terminal to the edge computing center to form a business data closed loop in the micro base station; and the business network element is configured to store non-real-time data processed by the edge computing center to a cloud platform via an operator core network to provide data resources for big data analysis and artificial intelligence (AI); the edge computing center is configured to acquire business optimization information from the cloud platform;

the micro base station access network enables a wireless network to cover all regions of all floors in a building to provide a wireless network access service for a distributed unit, i.e., a user terminal, in the building;

a virtual terminal application service of the edge computing center comprises:

constructing a virtual terminal on demand:
for a terminal having or entering an indoor network, the edge computing center creates the virtual terminal according to a unique identification code of the terminal, and the terminal uses the function of the virtual terminal or uses the virtual terminal; a user can customize a desired service through the virtual terminal or download desired application software;

for a fixed application scenario, factory/enterprise business-related user information, virtual terminal configuration information and business data are stored in a cloud storage to ensure the data security of a factory/enterprise and the integrity and availability of the data; for a private application scenario, personal private data is stored in the terminal native machine;

logging out the virtual terminal and recovering resources: a virtual terminal manager of the edge computing center sets a user logout strategy; for a fixed user of this region, the virtual terminal is retained until being manually logged out; for a temporary user of this region, once the user terminal leaves the region, the virtual terminal enters a resource recovery queue and is logged out in sequence according to the first in and first out principle, and the resources are recovered.

5. The global communication network system based on a micro base station and edge computing according to claim 4, wherein the virtual terminal comprises a resource pool; the resource pool comprises terminal information and provides application software invoking; and the virtual terminal provides cloud computing and cloud storage services.

6. The global communication network system based on a micro base station and edge computing according to claim 4, wherein the edge computing center provides a "terminal resource mapping service" that is loaded to the virtual terminal and provides a physical terminal mapping service so that the virtual terminal on the server accesses an actual physical terminal device.

7. The global communication network system based on a micro base station and edge computing according to claim 4, wherein the edge computing center provides an "intelligent protocol conversion module" that is loaded to the virtual terminal and provides protocol conversion, package and parsing services for application software and a physical terminal.

8. A global communication network system based on a micro base station and edge computing, comprising:
at least one micro base station;
wherein the micro base station comprises an edge computing center, a business network element and a micro base station access network;
the edge computing center is configured to provide a computing service, a network service, a cloud storage service and a security service through virtualized and hyper-converged architecture, and is further configured to provide a virtual terminal service, distributed parallel task scheduling, a distributed task execution service and a distributed data warehouse; wherein services of the edge computing center are visible to the business network element;

the business network element is configured with a control plane and a user plane in separate form to decentralize a business demand function of a network user; the control plane is configured for mobility and access management of a user terminal, session management, strategy control, user data management, authentication management, and security mode control; the user plane is configured for executing routing and business forwarding functions;

the business network element is configured for distributing and guiding traffic of the user terminal to the edge computing center to form a business data closed loop in the micro base station; and the business network element is configured to store non-real-time data processed by the edge computing center to a cloud platform via an operator core network to provide data resources for big data analysis and artificial intelligence (AI); the edge computing center is configured to acquire business optimization information from the cloud platform;

the micro base station access network enables a wireless network to cover all regions of all floors in a building to provide a wireless network access service for a distributed unit, i.e., a user terminal, in the building;

the distributed parallel task scheduling and distributed task execution services features of a data packet:
parameter defining:
ts: time stamp (UTC)
ip1: source terminal network address
id1: unique identification code of source terminal
ip2: network address of target terminal, defaulted
id2: unique identification code of target terminal, defaulted
pr: authentication information
sd: security level
py: priority level
td1: maximum allowable delay
td2: actual delay
taskid: task ID
mtd: task dependency
bsdata: business data contents of the data packet:
data packet sent/received by a business system=F(ts, ip1, id1, ip2, id2, pr, sd, py, td1, td2, taskId, mtd)+bsdata;
mtd=F1(task 1 that must be processed first, task 2 that must be processed first, . . . , task n that must be processed first);

distributed parallel task scheduling flow: maintaining an "available service list" of the edge computing center, parsing F(ts, ip1, id1, ip2, id2, pr, sd, py, td1, td2, taskId, mtd) from the data packet, parsing parameters: ts, ip1, id1, ip2, id2, pr, sd, py, td1, td2, taskId, mtd hierarchically, distributing tasks to be executed preferentially according to the "priority level" and the "maximum allowable delay", distributing task offloading channels according to the resource capability, putting "task ID" into task queues of all the channels respectively, maintaining the task list, and monitoring task execution;

distributed task execution service flow: acquiring the to-be-executed tasks from the task queues of all the channels, or executing a preference strategy and then executing the tasks, refusing to execute user-initiated illegal/insecure tasks according to the "authentication information" and "security level", feeding back the task execution to a scheduling center, and returning task execution data to a task initiator.

\* \* \* \* \*